Feb. 24, 1925.
R. E. HORNBECK
FRUIT PRESS
Filed June 17, 1924
1,527,481
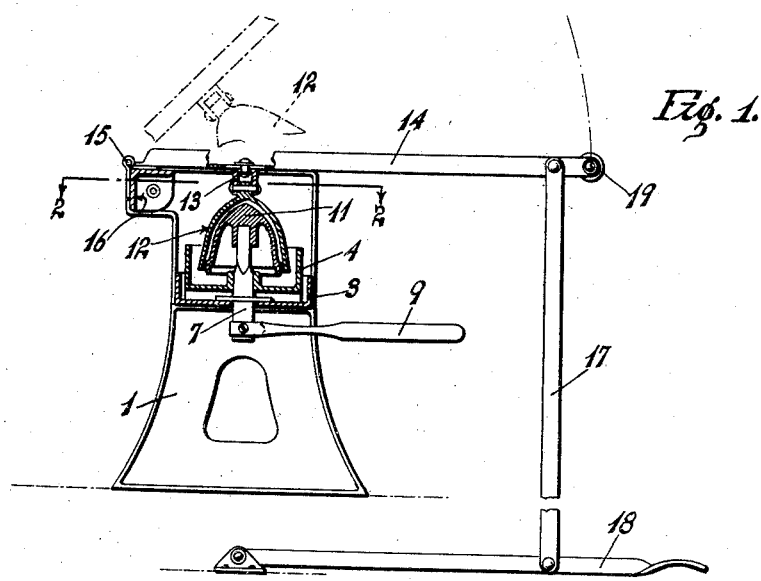
Fig. 1.
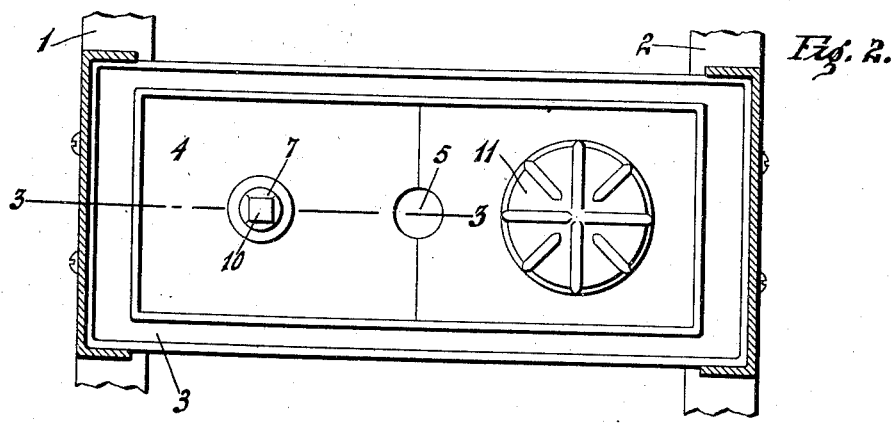
Fig. 2.
Fig. 3.
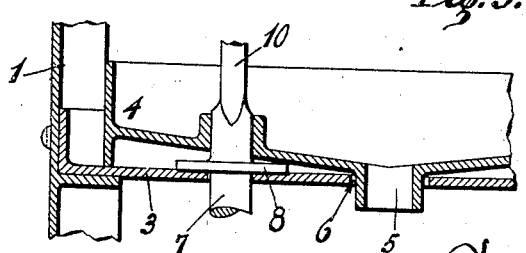
INVENTOR.
Richard E. Hornbeck
BY
Harry C. Schroeder
ATTORNEYS.

Patented Feb. 24, 1925.

1,527,481

UNITED STATES PATENT OFFICE.

RICHARD E. HORNBECK, OF ALAMEDA, CALIFORNIA.

FRUIT PRESS.

Application filed June 17, 1924. Serial No. 720,561.

*To all whom it may concern:*

Be it known that RICHARD E. HORNBECK, a citizen of the United States, residing at Alameda, in the county of Alameda and State of California, has invented certain new and useful Improvements in Fruit Presses, of which the following is a specification.

My invention is an improved fruit press the object of which is to provide a simple structure, inexpensive to manufacture, and the various parts of which may be readily disassembled for cleaning.

In the annexed drawing in which my invention is illustrated:

Figure 1 is a transverse sectional view of my press.

Figure 2 is a sectional view taken on the line 2—2 of Figure 1, with certain parts removed to show the structure beneath.

Figure 3 is a fragmentary sectional view taken on the line 3—3 of Figure 2.

Referring more particularly to the drawing, my press includes a pair of standards 1 and 2, to which a tray 3 is secured. A fruit receiving tray 4 is positioned within the tray 3, and is not secured thereto, but may be readily removed for cleaning. The sides of the tray 4 are inclined towards the center at which point a drain spout 5 is positioned, which spout extends downwardly through an aperture 6 in the floor of the tray 3.

A pair of posts 7—7 extends through the trays 3 and 4. A boss 8 on the post rests against the bottom of the tray 3 thus holding it in position. A handle 9 is removably secured to the bottom of each of the posts 7—7 by means of which said posts are rotated as will be further described.

The top of each of the posts is squared as at 10, and is adapted to receive a plunger 11—11 of any suitable design, which plunger has a socket therein into which the square end 10 projects, thus the plunger may be readily removed from the post for cleaning. A cup 12 is adapted to fit over the plunger 11 in a way usual for this type of device to press the fruit over said plunger and remove the juice therefrom. The cups 12 are secured to a clip 13 which is removably secured to an arm 14 hinged at 15 to a cross bar 16 secured to the standards 1 and 2.

A link 17 is pivoted to the arm 14 and extends downwardly to a foot pedal 18 pivoted to the floor. A handle 19 is secured to the arms 14 by means of which said arms may be swung upwardly carrying the cups 12 away from the plungers 11 to remove the fruit rind.

In operation the fruit is placed on the plungers 11, the cup 12 is placed there-over and pressure is exerted on the foot pedal 18. The plungers 11 are slightly rotated by actuating the handles 9, and the juice flows into the tray 4, and out of the spout 5 into a suitable container. This press may be employed in one or more units, as desired.

Having described my invention, I claim:

1. A fruit press comprising a pair of standards, a tray secured to said standards, a second tray resting within said first named tray and having an outlet therein, a post journaled in said first named tray and extending through said second tray, a plunger mounted on said post, a cup adapted to extend over said plunger, an arm secured to said cup, a foot pedal and a link connecting said arm and said foot pedal.

2. A fruit press comprising a pair of standards, a tray secured to said standards, a second tray resting within said first named tray and having an outlet therein, a post journaled in said first named tray and extending through said second tray, a plunger mounted on said post, a cup adapted to extend over said plunger, an arm secured to said cup, a foot pedal and a link connecting said arm and said foot pedal, a handle secured to said post, a plate extending between said standards, said arm being pivoted to said plate.

3. A fruit press comprising a pair of standards, a tray secured to said standards, a second tray removably mounted within said first named tray, a post extending through said first and second tray a flange on said post resting within said first named tray, a plunger having a socket therein into which said post extends, a cup adapted to extend over said plunger, an arm pivoted to said standards, said cup being removably mounted on said arm, a foot pedal, and a link connecting said arm and said foot pedal.

In testimony whereof I affix my signature.

RICHARD E. HORNBECK.